United States Patent [19]
Hocke

[11] 3,909,886
[45] Oct. 7, 1975

[54] DEVICE FOR TRACTION-PROOF AND PRESSURE RESPECTIVELY MOISTURE-TIGHT SEALING OF A CABLE END

[76] Inventor: Kurt Hocke, Virgilstrasse 9, 8000 Munich 80, Germany

[22] Filed: Dec. 17, 1973

[21] Appl. No.: 414,619

[52] U.S. Cl. ............... 24/122.6; 24/115 M; 29/461; 174/79; 403/274; 403/275
[51] Int. Cl.[2] ................. F16G 11/05; F16G 11/02
[58] Field of Search .............. 29/461, 624; 174/79; 339/100; 403/374, 274, 275, 365, 366, 368, 369, 373; 24/122.6, 115 M

[56] References Cited
UNITED STATES PATENTS

| | | | |
|---|---|---|---|
| 1,573,737 | 2/1926 | Norman | 403/274 |
| 2,327,831 | 8/1943 | Sutton | 403/275 |
| 2,952,832 | 9/1960 | Chandler | 339/100 |
| 3,085,305 | 4/1963 | Colombet et al. | 403/275 |
| 3,100,924 | 8/1963 | Trier et al. | 403/275 |
| 3,716,894 | 2/1973 | Kingston et al. | 403/275 |

FOREIGN PATENTS OR APPLICATIONS

| | | | |
|---|---|---|---|
| 21,994 | 5/1900 | Switzerland | 403/274 |
| 31,692 | 6/1885 | Germany | 403/275 |
| 194,851 | 3/1923 | United Kingdom | 403/274 |
| 889,869 | 7/1949 | Germany | 403/274 |

*Primary Examiner*—C. W. Lanham
*Assistant Examiner*—Joseph A. Walkowski

[57] ABSTRACT

To produce a tension-proof and pressure respectively moisturetight uniform sealing of cable ends, a pulling mandrel is driven into the cables end. The pulling mandrel is pointed in the front, becomes constricted in the middle and has the shape of a somewhat truncated cone followed by a cylinder at the rear, where it is possible to construct a thread for screwing on a pulling eye. The cable wires and the cable jacket are pressed together over the constricted portion by means of a tension band.

6 Claims, 2 Drawing Figures

DEVICE FOR TRACTION-PROOF AND PRESSURE RESPECTIVELY MOISTURE-TIGHT SEALING OF A CABLE END

BACKGROUND OF THE INVENTION

1. Field of the Invention

A device for tension-proof and pressure respectively moisture-tight sealing of cable ends of multiconductor cables. The invention concerns a device for tension-proof and pressure repectively moisture-tight sealing of cable ends of multiconductor cables, in particular communication cables, consisting of a mandrel which is driven into the cable and a well known heat shrinking cap to effect tight sealing of the cable. If in particular a multiconductor cable has no tension-proof cable jacket and for example need to be pulled through a cable duct, it is necessary to have a reliable connection between the drawing-in wire and the beginning of the cable. For this purpose there has been inserted on one end of unarmored cable a tension-proof sealing which allows equal transmittance of the occurring tensile forces to all wires within the cable as well as on the cable jacket during the cablelaying process.

2. Description of the Prior Art

It is known, that a traction device consisting of a straddling dowel is driven into the cables end and that the cable end is sealed by means of a cap and a stopper made of a hardening synthetic material.

A further suggestion concerned a cable-clamping head consisting of a doubletaper pin to be driven into the cable core and a matching sleeve with an internal taper hole. The cable wires are clamped between the pin and the sleeve so that the tractive forces acting on the pin are transmitted uniformly to the cable core.

A further modification for a pulling anchor consists of a mandrel to be driven into the cables end, a cap to be screwed onto the mandrel, and of a directly surrounding sleeve made of an elastic deformable material. The sleeve is clamped between one shoulder of the mandrel and the cap enclosing the cable end from outside, and it is pressed together in a longitudinal direction by the screw connection. For practical purposes the cap has a larger diameter in the middle of its length than at its two ends. When the screw connection on the mandrel is tightened, the elastic sleeve is pressed together, and as a result of its elasticity it undergoes lateral deformation, that is to say it increases in diameter and in doing so presses the surrounding cable core with the cable jacket against the inner side of the cap.

SUMMARY OF THE INVENTION

It is an object of the invention to provide a tension-proof and pressure respectively moisture-tight sealing of cable ends for multiconductor cables, in particular communication cables, that can be uniformly used in either the factory, warehouse or at the field, as a standard sealing of the cable end; with a minimum material expenditure whereby the mounting is quick and reliable and installation possible with customary tools. Cast resin should not be used, so that the cable end is ready to be sealed immediately after being manufactured.

According to the invention, the device for tension-proof and pressure respectively moisure-tight sealing of the cable ends of multiconductor cables as described in the introduction, is characterized in that the mandrel has a relatively flat tapering point on its front portion, becomes constricted in the middle and has the shape of a somewhat truncated cone followed by a cylinder at its rear, where it is possible to construct a thread for screwing on a pulling eye. To produce a tension-proof and pressure respectively moisture-tight sealing of cable ends on multiconductor cables the mandrel is driven into the cable core; in the area above the constricted portion of the mandrel it is proposed that a tension band is used to constrict the cable wires as well as the cable jacket in the constricted portion of the mandrel. If for example the tension band is laid over the cable jacket and is under tension a deepening is formed in the area of the constriction, that can in event be filled up with sealing tape to such a degree that there is a uniform surface on the cable end. Finally a heat shrinking cap is placed over the cable end and if required a pulling eye is screwed into the mandrel. If a pulling eye is used, it is advantageous when pulling eye and heat shrinking cap constitute one unit. In order to close the cables end pressure-proof or at least moisture-tight, the shrinking cap is shrunk onto the cable jacket by means of heating.

BRIEF DESCRIPTION OF THE DRAWINGS

In the following the invention will be described in more detail with the aid of 2 drawings which merely represent an example of application.

DETAILED DESCRIPTION

Figure 1:
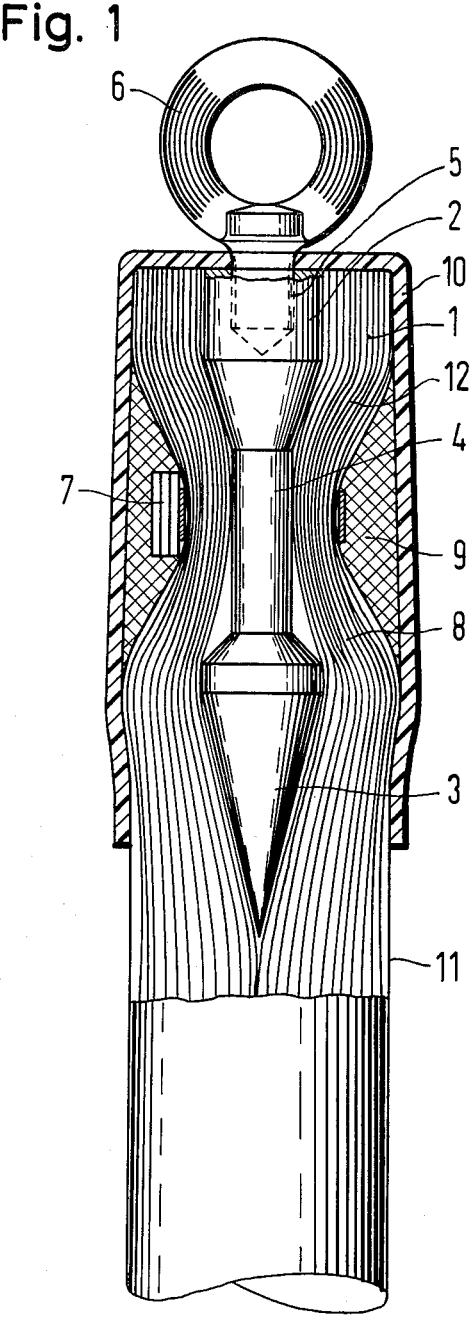
FIG. 1 illustrates a longitudinal section of a tension-proof and pressure respectively moisture-tight cable and seal according to the invention.

Referring now to FIG. 1, there is illustrated in the cable end 1, the driven in mandrel 2. The mandrel has at its front a relatively flat tapering point 3 becomes constricted in the middle 4 and at its widening rear a thread 5 for screwing on a pulling eye 6. The point 3 works as a pulling wedge because this part is wrapped around to a certain extent from those by the tension band 7 tied together wires of the cable core 8. At the end of the cable the wires that are located at the enlarged rear part of the pulling mandrel are in a normal position. As a result of the tying together by the tension band 7 a compressed deepening 9 arises in the area of the tied-together portion, that is filled up with sealing tape. Consequently there again exists a uniform surface on the cables end. A heat shrinking cap 10 is pushed over the so formed cable end and the pulling eye 6 is screwed into the thread of the mandrel. The shrinking cap and the pulling eye can advantageously build one unit. Finally the shrinking cap is heated so that it lies on all sides with its walls against the cable jacket 11 and forms a tight bond with the jacket.

Figure 2:
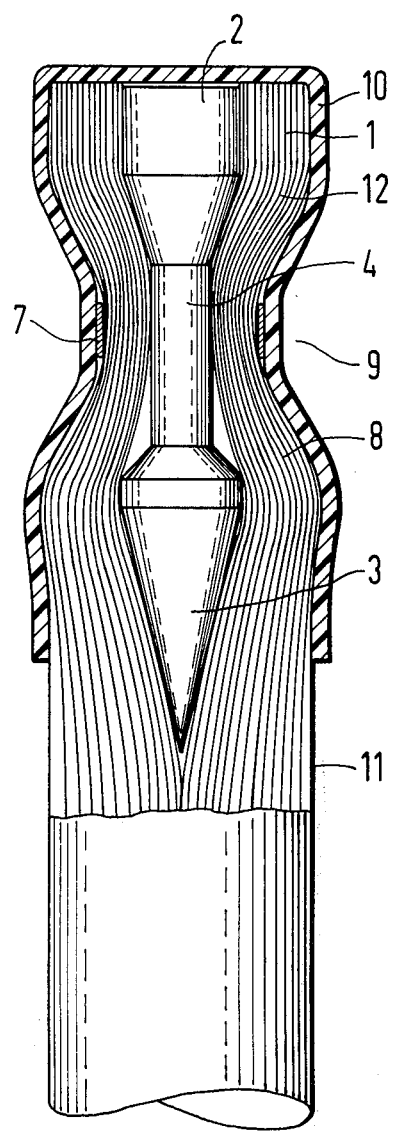
FIG. 2 illustrates a longitudinal section through another carrying out form in the object of FIG. 1.

FIG. 2 illustrates the same arrangement as displayed in FIG. 1 without the sealing tape and pulling eye. It shows an embodiment of this arrangement for the cable grip, which is assumed to be well known.

A particular advantage of the device according to the invention is the fact that the zones where the mechanical forces are transmitted and where a tight cable seal is established are completely separate from each other. The tensile forces, in fact, are transmitted mainly by the pulling wedge 3 which spreads the cable wires apart at this point, in cooperation with the fixed tension band 7 in the constricted area. A second tensile force transmission arises by the anew enlarged rear portion 2 of the pulling mandrel, because in an extreme case the cable wires try to draw back into that through the tension band 7 constricted portion 12. The non-positive connection between the pulling mandrel and the cable core takes place in a two-fold manner. The sealing of the cable end by means of a heat shrinking cap 10 takes place independent of the devices of power transmission, so that the area of cable sealing is virtually free of mechanical tension. Looking at it all together the material expenditure to manufacture the device according to the invention is comparatively small and the manufacture of the sealing of the cable end is possible with conventional tools. The cable ends do not need to be prepared in any special way. The pulling mandrel 2 can be driven into the cable end with a hammer. Furthermore, if sealing tapes are used, they can be mounted without special tools. Since no casting resin or other sealing material involving a lengthy application process is used, it is possible to have a quick and reliable mounting with minimum tool expenditure. The favorable distribution of the tensile forces on the wires allows for the use of increased tensile force. The small space requirement is also of special advantage. The enlargement of the diameter of the cable and through the device after the invention is negligible.

I claim:

1. A pulling attachment for a cable end of a communications cable wherein said attachment is introduced into the end of a cable and coaxially disposed with respect to the sheath thereof, comprising a mandrel possessing front and rear sections separated by at least one cylindrical middle section of reduced diameter with respect to said front and rear sections, said front section comprising a tapered conical tip expanding to a diameter larger than that of said middle section, and said rear section comprising a truncated cone extending from the reduced diameter of said middle section to a cylindrical rearmost portion, said attachment further comprising at least one tensioning means arranged around said at least one middle section of reduced diameter which presses the wires of the cable against the mandrel at an area of reduced diameter.

2. The attachment of claim 1 wherein said mandrel possesses a plurality of sections of reduced diameter, said sections each having tensioning means arranged around them.

3. The attachment of claim 1 further comprising a sealing cap placed over the end of said cable after said mandrel and said tensioning band are in place at the end of said cable.

4. A pulling attachment as claimed in claim 1 wherein the cylindrical rear end of the mandrel is provided with a thread.

5. A pulling attachment as claimed in claim 1 wherein the tensioning means is a clamp.

6. A pulling attachment as claimed in claim 1 wherein the tensioning means is a tensioning band.

* * * * *